United States Patent [19]

Rausing et al.

[11] Patent Number: 4,606,954
[45] Date of Patent: Aug. 19, 1986

[54] ARRANGEMENT FOR THE MANUFACTURE OF PACKING CONTAINERS

[75] Inventors: Anders R. Rausing, Lausanne, Switzerland; Erling I. Nilsson, Åkarp, Sweden

[73] Assignee: Tetra Pak Developpement SA, Pully, Switzerland

[21] Appl. No.: 778,073

[22] Filed: Sep. 20, 1985

Related U.S. Application Data

[62] Division of Ser. No. 541,321, Sep. 9, 1983, Pat. No. 4,557,888.

[30] Foreign Application Priority Data

Jan. 20, 1982 [SE] Sweden .............................. 82002868

[51] Int. Cl.⁴ .............................................. B29C 1/12
[52] U.S. Cl. ...................................... 428/36; 215/1 C; 206/524.2; 206/524.6; 156/86; 156/203
[58] Field of Search ........................... 428/36, 35, 458; 215/1 C; 206/524.2, 524.4, 524.6; 156/84–86, 69, 203, 244.13, 244.19

[56] References Cited

U.S. PATENT DOCUMENTS

| | | | |
|---|---|---|---|
| 2,396,635 | 3/1946 | Bogoslowsky | 264/230 |
| 3,032,823 | 5/1962 | Sherman | 425/389 |
| 3,347,970 | 10/1967 | Hanna | 264/230 |
| 3,767,507 | 10/1973 | Stahlecker et al. | 156/85 |
| 4,014,724 | 3/1977 | Rausing | 264/230 |
| 4,054,474 | 10/1977 | Collins, III et al. | 264/230 |
| 4,085,244 | 4/1978 | Stillman | 428/192 |
| 4,121,402 | 10/1978 | Cross et al. | 264/230 |
| 4,126,238 | 11/1978 | Rausing | 264/230 |
| 4,129,467 | 12/1978 | Knutsson | 156/85 |
| 4,142,630 | 3/1979 | Hayes et al. | 206/277 |
| 4,151,024 | 4/1979 | Ohlsson | 264/248 |
| 4,312,689 | 1/1982 | Amneus | 264/248 |

FOREIGN PATENT DOCUMENTS

| | | | |
|---|---|---|---|
| 56-77123 | 6/1981 | Japan | 264/248 |
| 56-84260 | 7/1981 | Japan | 264/248 |
| 413477 | 9/1978 | Sweden . | |
| 1481167 | 7/1977 | United Kingdom . | |

*Primary Examiner*—John E. Kittle
*Attorney, Agent, or Firm*—Burns, Doane, Swecker & Mathis

[57] ABSTRACT

The invention relates to a method for the manufacture by means of shrink-forming of a packing container of orientation-stretched laminate comprising polyester and aluminium foil, the laminate being formed to a tube (14) and subsequently being made to shrink over a mandrel (10,28) to the intended shape.

5 Claims, 12 Drawing Figures

ARRANGEMENT FOR THE MANUFACTURE OF PACKING CONTAINERS

This application is a division, of application Ser. No. 541,321, filed Sept. 9, 1983, now U.S. Pat. No. 4,557,888.

The present invention relates to a method for the manufacture of a packing container from a web or a plane sheet or blank of a heat-shrinkable material comprising a laminate of orientation-stretched polyester, which has at least one surface coating of glycol-modified polyester (so-called PETG), the said web or sheet being formed to a tube in the first place in that two opposite edge zones of the web or sheet are joined together, and that thereafter parts of the tube formed are heated so that the material for the purpose of forming is made to shrink. The invention also relates to an arrangement for the realization of the method and to packing containers manufactured in accordance with the method.

It is known in the technology of packaging that bottlelike packing containers can be manufactured by the plastic deforming of packing material in the form of a web or a blank. This is done e.g. by blowing of plastic bottles, but also by the shrink-forming of a previously orientation-stretched plastic material, which after heating is made to shrink over a mandrel. It has long been desirable to manufacture such containers with a gas-barrier layer, which is necessary if the contents are pressurized or sensitive to oxygen gas. One example of such a product is beer, which has to have a packing material, which does not give admission to oxygen gas from the atmosphere as this would have a detrimental effect on the quality of the beer, and which neither lets out the carbon dioxide in the beer package.

It is known that for this purpose plastic material can be used, which is formed by blowing or deep-drawing, and in this connection both acrylonitrile material, e.g. a material which is marketed under the trade mark BAREX, has been used, but also polyester material. The acrylonitrile material has the advantage that it has relatively good gas-tightness characteristics, but it has on the other hand inferior pressure, absorbing characteristics and is subject to a constant deformation, so-called creep, when it is exposed to pressure. Polyester material for its part has very good pressure-absorbing characteristics, especially if it is orientation-stretched, whilst in return the gas-tightness is inferior.

It is well known that aluminium foil has very good gas barrier properties even if the aluminium foil is extremely thin (5 $\mu$m or less). However, the problem has been to create a plastic deformable laminate comprising aluminium foil. Up to now this has been impossible, owing to the fact that an aluminium foil will rupture when it is stretched already when the stretching only is a few per cent and this means that laminate comprising aluminium foil can not be blown or deep drawn in a normal way. A laminate, which is containing a combination of aluminium foil and orientation stretched polyester should be an ideal packaging material, for instance beer, provided the laminate can be formed to a container or bottle. Up to now it has not been possible to use aluminium foil as a gas barrier in a container, which has been produced by plastic deforming of a material, but the present invention is giving a teaching about a method and a device for producing such packaging containers, which characterizing features appear from the enclosed patent claims.

An embodiment of the method and device in accordance with the invention will in the following be described with references to the enclosed schematic drawing, in which:

FIG. 2 is showing a conventional overlap joint,

FIG. 3 is showing an overlap joint, in which the aluminium foil layer has been cut out along one of the web edges, and FIG. 4 is showing an overlap joint with cut-out parts in the aluminium foil layer and with an intermediate sealing layer in the form of a string of plastic material.

Figure 12:
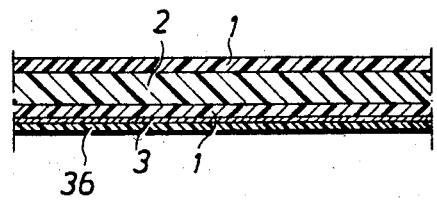

FIG. 12 finally is showing an alternative embodiment of the laminate for the manufacture of containers in accordance with the invention.

As mentioned earlier, it is the object of the present invention to provide methods and means for the manufacture of a packing container from orientation-stretched polyester and in particular a container, which in addition is gas-tight. It is a further pre-requisite for the invention that it shall be possible to furnish the material for the package as a web or plane blank and not, as is the case now, in the form of seamless extruded tubes or injection-moulded semi-finished products. Thus it is a condition for the manufacture of a container in accordance with the invention that the material, on the one hand, should be subjected to plastic form-processing and that, on the other hand, it should be joined together in sealing joints and that the material should be biaxially orientation-stretched and contain a gas barrier.

It has been mentioned in the preamble that orientation-stretched polyester, which has very good tensile strength characteristics cannot be heat-sealed after the orientation stretching, since a crystalline structure has been imparted to the material. However, polyester (PET) can be co-extruded with a modified polyester, so-called glycol-modified polyester (PETG), and since these materials are very closely akin, they fuse together during the co-extrusion in a boundary area in such a manner that after the extrusion the materials cannot be separated from one another. It is possible, for example, in such a co-extrusion to have a central layer of PET and outer PETG layers on either side thereof. Such a laminate, after the extrusion operation, can be subjected to a joint orientation-stretching at a suitable temperature (approx. 70°–80° C.), the central PET layer being molecular-oriented and given a crystalline structure, whilst the two outer PETG layers substantially retain their amorphous molecular structure and consequently their heatsealing capacity. If the material is stretched four times in two directions at right angles to one another the total stretching will be 16 times, that is to say the surface of the material increases 16 times. If the stretching becomes altogether too great (25 times), the PETG layers begin to crystallize more and more with the heat-sealing capacity diminishing to a corresponding degree. This means that the stretching of the material cannot be forced to an unlimited degree, but a stretching of the laminate to 20–25 times is quite possible whilst retaining the heatsealing capacity of the outer layers. Such an orientation-stretched laminate has very great tensile strength and is thus suitable packing material for pressurized contents, e.g. beer, refreshing beverages etc. However, the gas-tightness generally is not sufficient and for this reason a layer providing gas-tightness has to be introduced into the laminate. Such a layer providing gas-tightness may consist of a gastight plastic e.g. polyvinyl alcohol (PVA), polyvinylidene chloride (PVDC) or of the type of acrylonitrile material, which comes on the market under the trade mark BAREX. A material with altogether superior gas-tightness properties, however, is metal foil and in particular aluminium foil, which even in thicknesses of 5 $\mu$, that is to say 5/1 000 mm is as good as completely gastight. However, such a thin aluminium layer is very fragile and on the whole tolerates no tensile stresses whatever, whereas on the other hand it can be wrinkled together relatively readily if it is allowed to shrink together with a plastic material. The aforementioned, orientation-stretched laminate thus can be laminated with a thin aluminium foil, which is done with the help of a varnish, which fastens onto the aluminium foil surface as well as to the oriented polyester surface. Outside the aluminium foil may be placed a further layer of thermoplastic, e.g. polyethylene or PETG, which in the abovementioned material is advantageous, especially as the laminate is to be folded to a tube by joining together outside and inside of the laminate in an overlap join.

Figure 1:
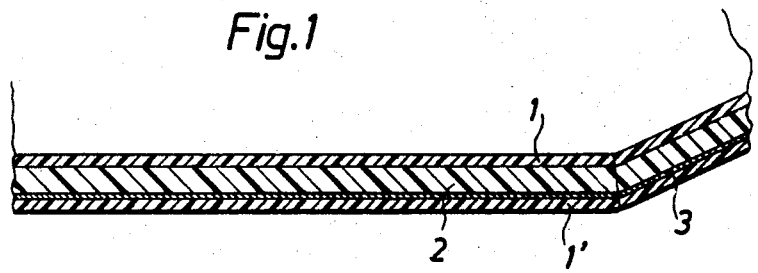
FIG. 1 is showing an enlarged cross-section of an orientation stretched packaging laminate.

In principle it is not necessary to apply PETG layers to both sides of the PET layer, but in the enclosed FIG. 1 a laminate is shown, which has been manufactured in such a manner that in the first place a PET layer 2 and a PETG layer 1 have been extruded jointly and have been subjected to orientation-stretching in two directions at right angles to each other. An aluminium foil layer 3 has been coated by an extrusion process with a PETG layer 1', whereupon the orientation-stretched PET layer is varnish-laminated to the aluminium foil/PETG laminate. The laminate shown in FIG. 1 thus contains two surface layers 1 and 1' of PETG (the one layer 1 having been orientation-stretched) and a central base layer 2 of biaxially orientation-stretched PET and an aluminium foil 3.

Figure 2:
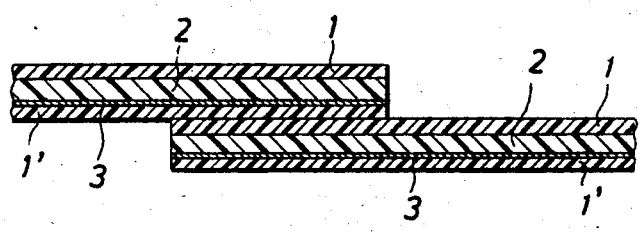
FIGS. 2, 3 and 4 are showing how a laminate, in accordance with FIG. 1 in the form of a web or a sheet, is folded into a tube by joining the longitudinal edges of the web or sheet in an overlap joint. The figures are showing the overlap joint in an enlarged cross-section.
Figure 3:
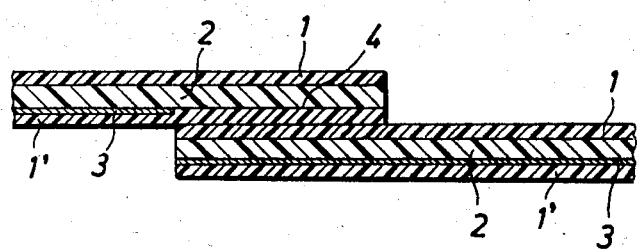

As mentioned earlier it is possible, starting from this material in the form of a web or blank, to manufacture a pipe or tube by joining together opposite edges of the sheet or blank in an overlap join. In FIG. 2 is shown how the laminate in accordance with FIG. 1 has been joined in such an overlap join, and it is possible to imagine that this join becomes a longitudinal sealing join in a pipe or a tube. For the sake of simplicity the different laminate layers in FIGS. 2, 3 and 4 have been provided with the same reference designations as in FIG. 1. If FIG. 2 is studied more closely it will be found that a material fusion and connection can be obtained between the layers 1 and 1'. However, the layer 1' is very thin and since the adhesion force in the varnish-lamination layer between the layer 1' and the aluminium foil layer 3 is considerably lower than the adhesion force between the layers 1 and 2 and the layers 1 and 1', as these are heat-sealed to one another, it is found that the sealing join cannot absorb particularly large tensile stresses, since all the tensile stresses will be concentrated on the layer 1' in the upper layer in the overlap join, since the other layers 1 and 2 cannot participate in the absorption of the forces, as they are separated from the layer 1' by the varnish-laminated aluminium foil layer 3.

Figure 4:
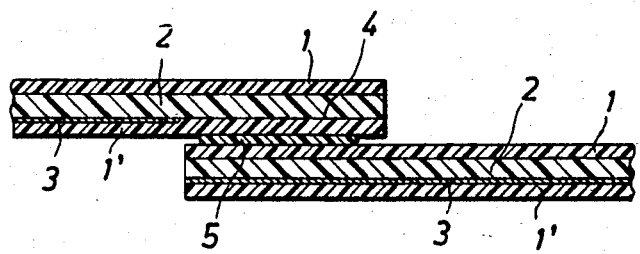

Thus if the laminate is to be used in packing containers for pressurized contents, a longitudinal join on the tube from which the package is to be made can not be manufactured in accordance with FIG. 2. A better solution of the problem is provided by the sealing joints according to FIG. 3 and 4. As is evident from FIG. 3, the material edge, which is located uppermost in the overlap join, is provided with a cutout 4, wherein the aluminium foil layer 3 is not present. This cutout runs along the edge region and has a width, which corresponds to the width of the overlap join. It has been found that by the introduction of such a recess the strong, orientation-stretched base layers 2 remain firmly anchored to each other in the overlap join by virtue of the PETG layers 1' and 1 having been made to fuse together with each other. Since a molecular-oriented plastic material is made to shrink when it is heated to such a degree that the orientation stresses are released, it can be difficult to achieve an overlap join in accordance with FIG. 3. If the layers only are heated, either the shrinking stresses can be released or the orientation too can be destroyed, which has the effect that the material loses its strength. This must not be allowed to happen, since the join must be equally strong as the remainder of the packing material, if it is to be possible for the internal pressure in the packing container to be absorbed. A solution of the problem is illustrated in FIG. 4 and this solution implies that a strand 5 of molten PETG material is extruded onto both or just one of the edge regions, which are to be joined to one another in an overlap join, whereupon the edge regions are combined and pressed against one another whilst they are cooled from the outside of the material. It has been found that by regulating the temperature and volume of the extruded strand it is possible to regulate the heat content in the strand in such a manner that heat is transferred to the adjoining PETG layers to such a degree that these are melted in their surface regions so as to form a substantially homogeneous connection layer, which comprises the layers 1' and 1 situated in the overlap join as well as the extruded strand 5. If the heat content in the strand 5 is controlled correctly, the heat is consumed only to perform the seal without heating the remaining parts of the laminate in such a manner that shrinkage is occasioned or a loss of the orientation occurs.

It has been found that by realising a longitudinal tube join according to FIG. 4 and at the same time introducing a cutout 4 of the aluminium foil along one edge region of the laminate, a join can be obtained, which in respect of this strength is comparable with the rest of the material.

The tube or pipe of molecular-oriented PET/PETG-laminate provided with aluminium foil now formed can be form-processed further by shrink-forming over a mandrel and some embodiments of such a shrink-forming will be described in the following.

A tube manufactured from the abovementioned material, which has been sealed in a longitudinal join in the abovementioned manner, can be shrink-formed over a mandrel, and the following description will furnish several suggestions regarding methods and arrangements for the manufacture from a tube of shrinkable material of a bottlelike packing container of the laminate, which has been described earlier. Since the container aimed at is manufactured in such a manner that the end portions of a tube are shrunk in so as to form a bottle-like packing container, it is impossible to carry out the shrinkage over a solid mandrel, as it would not be possible in such a case to remove the shrunk packing container from the mandrel. It is possible though to carry out the shrinking operation with the help of an expandable mandrel, which after the shrinkage can be contracted so much that the expanded portions of the mandrel are contracted to a size, which corresponds to or is smaller than the solid portions of the mandrel. It is also possible to carry out the shrinking operation in two stages, one end of the tube in a first operating stage being shrunk over a solid mandrel until the desired profile of the shrunk area has been achieved, whereupon the tube shrunk along its one end is withdrawn from the mandrel and is applied to an expandable mandrel, along whose surface the opposite end of the pipe or tube can be shrunk, after which the mandrel is contracted and withdrawn through the remaining opening. It has been found to be an advantage moreover if the shrinkage process is carried out in such a manner that two or more units are shrink-formed simultaneously over dividable mandrels, which can be separated after the shrinkage when the shrunk portions of the tube too have been separated by means of (cuts) through the tube wall.

Figure 5:
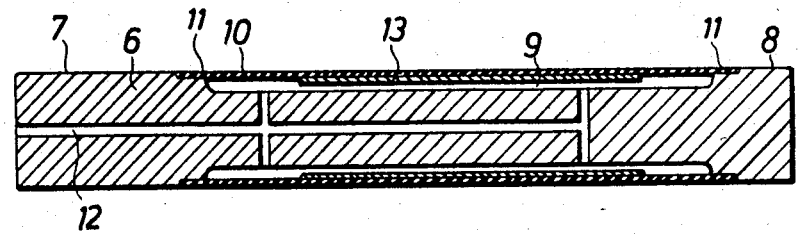
FIG. 5 is showing an expandable mandrel.

In FIG. 5 is shown an expandable mandrel for the manufacture of a bottlelike packing container and, as is evident from the figure, the mandrel 6 comprising two solid portions 7 and 8 together with a cutout or recess 9 provided between the said portions. The said recess or cutout 9 is in communication with a system of ducts 12 for the supply of compressed gas and the cutout 9 is covered by an expandable membrane 10, which is fixed in a tight manner into the mandrel 6 along the fixing points 11. The membrane 10 is provided with reinforcements or stiffeners 13 in the shape of thicker membrane material, inserted wires or "beams" so as to guide the appearance of the membrane when it is expanded.

Figure 6:
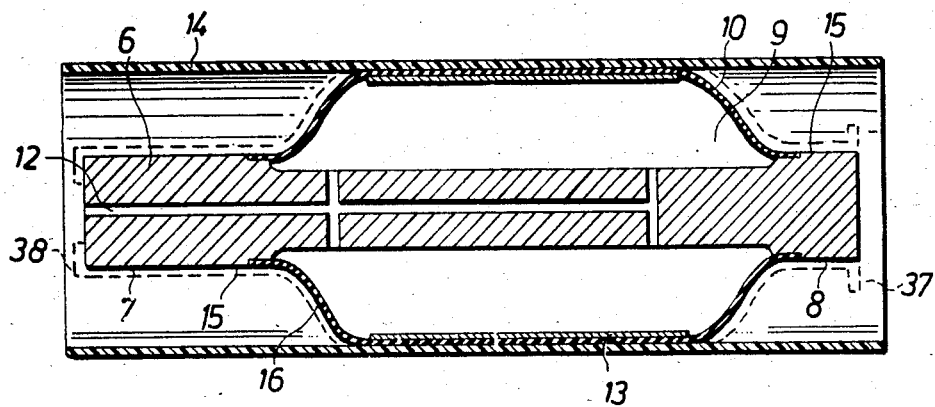
FIG. 6 is showing the mandrel in accordance with FIG. 5 after it has been expanded and a tube of packing laminate has been fitted over the mandrel.

When a packing container is to be formed, the mandrel 6 is expanded in that compressed gas is supplied through the duct 12, the pressure being increased in the cutout space 9. Owing to the increased pressure in the space 9, the expandable membrane 10, which may be manufactured from a rubberlike material, will be expanded in the manner as shown in FIG. 6. The expansion can be guided to a certain extent through the inserted wires or beams 13 so as to obtain a circular or at least less strongly curved portion of the expandable part of the mandrel. After the expansion of the mandrel the tube 14, which is manufactured from the aforementioned orientation-stretched laminate, is fitted, whereupon the end portions of the tube are heated so that the material is caused to shrink. As the material has been orientation-stretched as much as 10 to 20 times, the shrinkage may be forced very far and an accurate adhesion of the tube 14 to the mandrel 6 can be obtained. It should be noted that in this shrinkage the aluminium foil layer, which forms part of the laminate, will follow along without any breakages occurring in the aluminium foil layer. If the aluminium foil layer has good adhesion to the laminate moreover, the "shrinkage" of the aluminium foil layer will take place in the form of a very dense wrinkling or contraction. The "wrinkles" on the aluminium foil formed will be so small and dense that they can hardly be distinguished, but manifest themselves optically primarily through the disappearance of the gloss of the bare aluminium foil and through the shrunk portions of the laminate showing a "duller metallic lustre" derived from the aluminium foil laminate. During the shrink-forming of the laminate, however, no breakages occur in the aluminium foil layer, but the same stays intact and retains its gastight characteristics. If the aluminium foil layer is too thick and rigid, the shrinkage of the laminate may be rendered more difficult or be prevented, but it has been found that an aliminium foil layer of 5–10 $\mu$ thickness "follows" the laminate during shrinkage without difficulty and retains its sealing characteristics.

In FIG. 6, which shows the mandrel in accordance with FIG. 5 in expanded state, the laminate tube 14 is shrunk so that it adheres to the expanded mandrel, which is marked by a broken line in the figure. The shrunk tube 14 is designated 16 in FIG. 6, and as is evident from the figure the shrunk container 16 is provided with two cylindrical portions 15 of smaller diameter, which are shrink-formed around the solid mandrel portions 7 and 8 and a cylindrical or "barrel-shaped"-portion of larger diameter along the parts where the tube 14 adheres to the expanded part 10 of the mandrel 6. As can be seen in the figure, parts of the tube 14 may extend beyond the solid part of the mandrel 7. These are intended to form the "neck" or emptying opening of the packing container, where the material will shrink in over the end surface of the mandrel 6 to form an invard-turned flange 38, which may be shaped additionally with the help of a pressing tool, which is pressed against the end surface of the mandrel 6. In a similar manner the opposite part of the tube may be formed to an outward-turned flange 37 with the help of a tool, which flanges the material out and prevents it from shrinking down over the edge of the mandrel 6.

Figure 7:
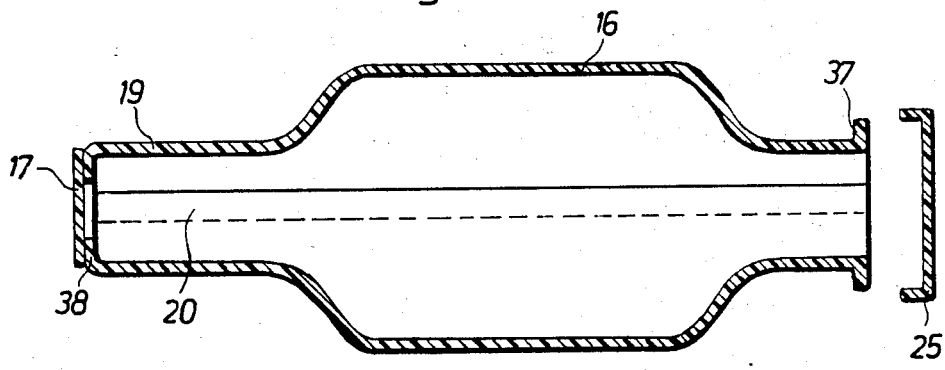
FIG. 7 is showing a packing container manufactured in accordance with the invention.

When the shrinking operation has been concluded, the duct 12 is connected to atmospheric pressure of a source of vacuum, which causes the membrane 10 to contract so that it assumes the position, which is shown in FIG. 5. This means that the mandrel 6 and the container part 16 formed can be separated from each other by withdrawing the container part 16 from the mandrel, and in FIG. 7 is shown the withdrawn container part. The container part 16 shown in FIG. 7, as has been made evident, has an inward-turned flange 38 at the end, which terminates the neck-shaped part 19 of the container as well as an outward-turned flange 37 at the part, which is intended to constitute the bottom of the container. Furthermore, in FIG. 7 the longitudinal sealing join of the tube 14, wherein a cutout has been made in the aluminium foil layer in the manner described earlier, is designated 20 and a plastic disc welded against the inward-turned flange 38 is designated 17. In the plastic disc 17, which should be made of the same material as the rest of the packing container, may be provided an emptying opening of optional type, e.g. a hole covered by a tear-off cover strip or a tear-off indication provided in the plate 17. The bottom of the container 16 may be closed after the container has been filled in that a plastic or metal end wall 25 is provided over the outward-turned flange 37 and is beaded together with the said flange so as to form a tight end wall closure.

The proportions shown in FIG. 7 of the packing container have been chosen only in order to illustrate clearly the method of manufacture, and the proportions naturally can be altered, e.g. the neck and bottom portions shrunk over the solid mandrel portions may be made shorter in order to make better use of the material and it also may be appropriate to arrange the mandrel in such a manner that the solid portion 8 of the mandrel 6, around which the bottom part of the container is shrunk, has a substantially greater diameter than the portion 7 of the mandrel 6, around which neck part 19 is shrunk.

Figure 8:
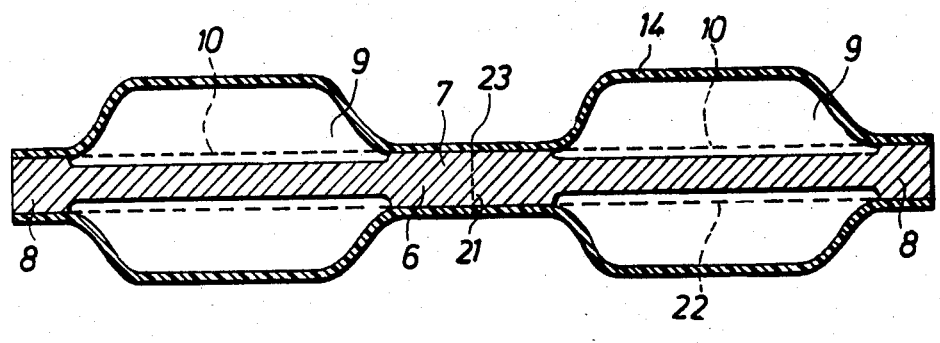
FIG. 8 is showing an expandable mandrel, on which two or more packing containers can be manufactured at the same time, and FIG. 9 a finished packing container in accordance with the invention.
Figure 9:
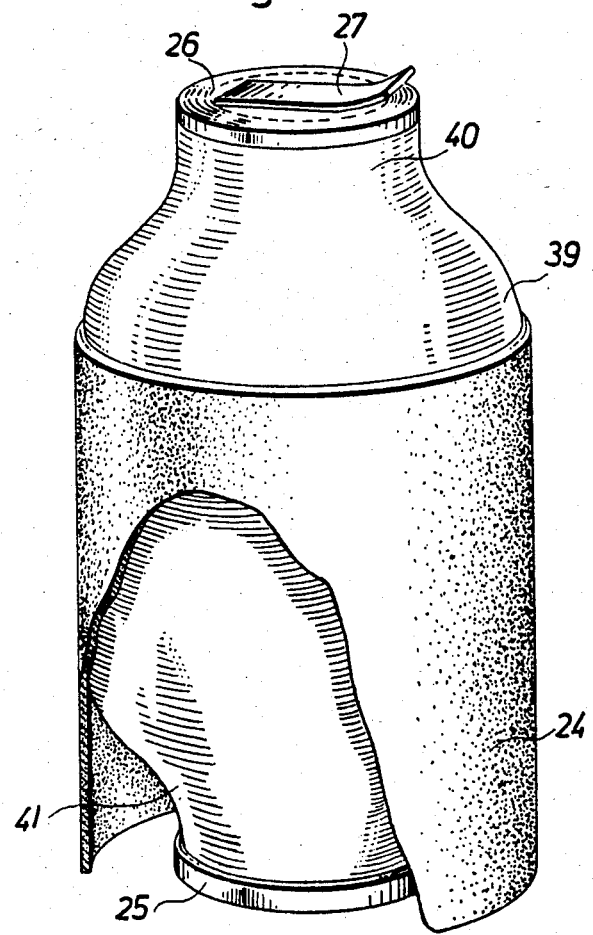

As mentioned earlier, it may be advantageous to manufacture several packing containers simultaneously in one shrinking operation. One of the advantages obtained by this, beside rationalization, is that the shrunk-in neck portions on the containers can be given a better defined length and edge than when the containers are shrunk individually. The reason for this is that a tube, which is shrunk around a mandrel, receives a somewhat uneven opening edge, which means that the edge has to be trimmed by cutting off a small amount. If on the other hand two containers facing one another are shrunk simultaneously, they can be separated readily by cut along the shrunk portion. This means that the two opening edges automatically will be well defined and uniform without anything having to be "trimmed off". In FIG. 8 is shown how two packing containers are shrunk simultaneously on a "long" mandrel 6. This mandrel 6 is constructed in principle in the same manner as the mandrel, which has been described previously, but it has instead two expandable membranes 10 and three solid mandrel parts, namely two outer solid mandrel parts 8, around which the bottom of the containers is shrunk and a central solid mandrel part 7, around which the neck portions of the two containers facing one another are shrunk. After the shrink-forming around the expanded mandrel 6 in the manner as described above, the shrunk tube 14 is cut along the central line 23 around the shrunk portion of the tube. The parts of the shrunk tube 14 thus separated can be withdrawn subsequently from the mandrel 6, and in order to facilitate the withdrawal, especially if the solid parts 8 of the mandrel have a larger diameter than the central solid part 7 of the mandrel, the mandrel 6 should be dividable along the line 21 so that, after the separation of the shrunk tube 14 along the annular line 23, the mandrel 6 is divided in that the mandrel halves are shifted in relation to each other, whereupon the shrink-formed container parts can be withdrawn from the mandrel parts after the expandable membranes have been returned to their starting position marked by a broken line. In FIG. 9 is shown schematically a packing container in accordance with the invention, partly cut open and as is evident from the figure the container consists of a central, non-shrunk part 39 of large diameter and a shrunk neck part 40 and a similarly shrunk bottom part 41. After filling, which preferably takes place through the open bottom part, the bottom part 41 is closed with a beaded-on end wall 25, e.g. of sheet-steel, whilst the top opening of the container is closed with the help of a weldedon end wall 26, which is fitted against the inward-turned flange of the container not shown here. In the end wall 26, which preferably may be made of plastic material, of PETG or a laminate of the same type as that from which the container is manufactured, a pouring opening is provided, e.g. in that a PETG strip 27 is welded onto the end wall 26, which moreover may be provided with weakening lines. When the strip 27 is torn away with the help of a free pull-lug, a part of the end wall 26 is also torn off so as to form an emptying opening. It is also possible to provide in an end wall a hole punched out in advance, which can be covered over with a tear-off strip or even realize the end wall with a hole having male or female thread so that it can be closed with a screw cap or a threaded plug. As mentioned earlier, the shrunk-in bottom portion of the bottle may be given a larger diameter than the neck portion, which implies having to make the end plate 25 somewhat larger. This is a certain advantage though as the supporting surface of the package will thereby be enlarged. If the supporting surface is considered to be insufficient, the package may be surrounded by an external sleeve 24, which is shown here in a partly cutopen condition. In most cases, however, the use of such a sleeve 24 will not be necessary.

Figure 10:
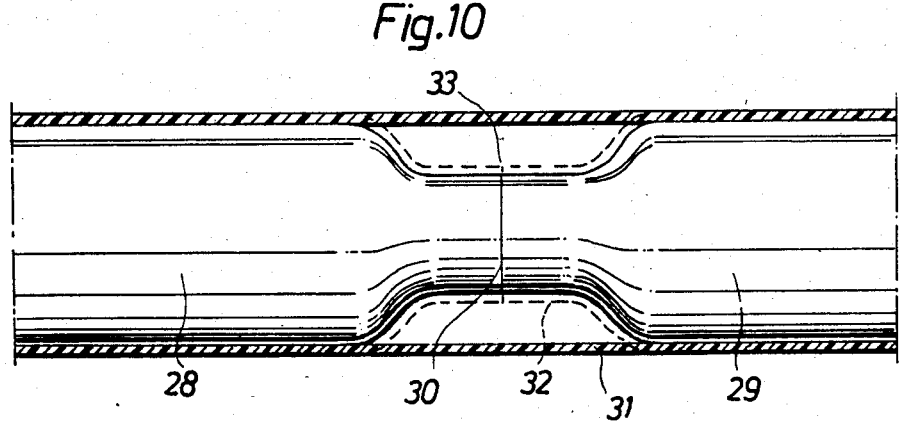
FIG. 10 is showing a variant of the method of manufacture, where the container is manufactured in two operations, the one shrunk-in end of the container being shrunk over a solid mandrel, whilst the other end, in a separate operation in accordance with FIG. 11, is shrunk with the help of an expandable mandrel.
Figure 11:
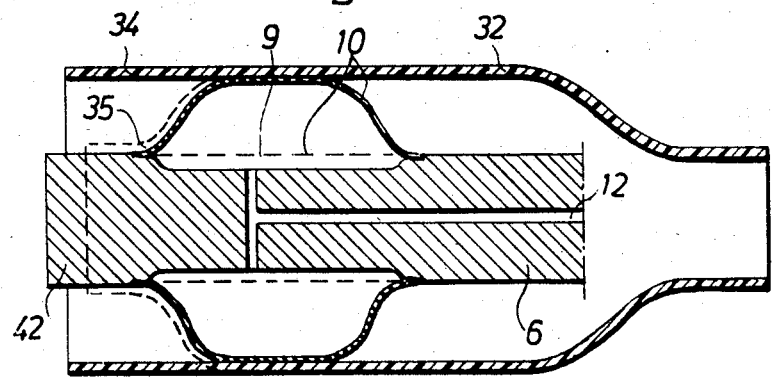

The packing container may also be manufactured in a different manner from that described here. For example, in accordance with FIG. 10, a pipe or a tube 31 of the type mentioned earlier comprising an aluminium foil layer or a layer of gastight plastic is shrunk around a solid mandrel consisting of separable parts 28 and 29. In this case the manufacture of the container is carried out in two stages, namely in the first place the tube 31 is fitted over the solid mandrels 28 and 29, whereafter the tube 31 is heated to shrinkage so that it accurately adheres to the profiled portions of the mandrels, the shrunk parts assuming the position shown in broken lines and marked 32. After the shrunk-in portions have become stabilized by cooling, the shrunk-in pipe or tube 31 is cut by means of an annular incision 33 to yield two formed halves. Now the mandrel portions 28 and 29 are separated from one another, whereupon the partly shrink-formed parts of the laminated tube are fitted onto a second mandrel 6, which shows great similarities to the expandable mandrel described in FIG. 5. The mandrel 6 thus has a solid mandrel portion 42 and an expandable membrane 10, which is stretched over a recess or a cavity 9. In the manner described earlier, the membrane 10 is expanded by supplying compressed gas through the duct 12 to the cavity 9. The partially shrunk package blank 32 is placed on the expanded mandrel 6 in the manner as shown in FIG. 11, whereafter the non-shrunk part 34 of the tube blank 32 is heated to shrinkage. As a result it is formed around the expanded mandrel to assume a position 35, which is indicated by broken lines. After the material has been stabilized by cooling, the expanded membrane 10 can be retracted by connecting the duct to atmospheric pressure or to a source of vacuum, whereafter the formed package can be withdrawn from the mandrel 6.

The packing container manufactured in accordance with the said two-stage process can be provided in a similar manner to that mentioned earlier with an outward-turned flange at its bottom end and with an inward-turned flange at its opening for the arrangement of a pouring opening and, after it has been filled, a plastic or metal lid can be beaded on around the outward-flanged lower end wall. As mentioned earlier, laminated combinations other than those shown in FIG. 1 and in the following figures will sometimes be used, and in FIG. 12 an alternative laminate combination is shown consisting of a co-extruded three-layer material, comprising a central layer 2 of PET and outer layers 1 of PETG. To this co-extruded three-layer material may be imparted a biaxial orientation-stretching. Then an aluminium foil layer 3 may be varnish-laminated or glued to one of the PETG layers 1 and a further, non-orientation-stretched PETG layer 36 may be laminated to the aluminium foil layer after the same has been primed with a varnish.

It has been shown that it is possible with the method and the arrangement in accordance with the invention to manufacture a packing container, which is very thin-walled (for the sake of greater clarity the wall thickness in the enclosed figures has been exaggerated and the figures, in this respect, are not true to scale), which means that the consumption of plastic material for the packing containers can be kept extremely low, although the containers, thanks to the oriented polyester material, tolerate very high internal pressure and, thanks to the incorporated aluminium foil layer, possess very good gas-tightness. The packing containers manufactured in accordance with this method will be cheap to manufacture therefore and substantially surpass the containers known at present in respect of price, weight and gas-tightness.

We claim:

1. A plastically deformable tube, comprising a sheet of laminated web defining a first edge zone and a second edge zone, said web including a layer of orientation-stretched polyester, a layer of metal foil and a first surface layer of glycol-modified polyester adjacent said layer of orientation-stretched polyester, a second surface layer of glycol-modified polyester adjacent said layer of metal foil, said layer of metal foil being receded from a first edge zone of said sheet, said sheet being folded to form a tubular element with said first edge zone and said second edge zone overlapping, said first surface layer of said second edge zone being bonded to said second surface layer of said first edge zone.

2. The tubular element in accordance with claim 1, wherein said layer of metal foil is aluminum.

3. The tubular element in accordance with claim 2, wherein said aluminum foil is 5/1000 mm in thickness.

4. The tubular element in accordance with claim 2, wherein the first and second surface layers of said edge zone are bonded by thermally-induced fusion.

5. The tubular element in accordance with claim 2, wherein said tubular element further comprises a strand of extruded, glycol-modified polyester material positioned between and bonding said first surface layer of said second edge zone and said second surface of said first edge zone.

* * * * *